(Model.)

G. F. WHITE.
Cheese-Press.

No. 228,291.  Patented June 1, 1880.

Witnesses:
Fred G. Dieterich
P. C. Dieterich

Inventor:
George F. White
by C. A. Snow & Co.
Attorneys

UNITED STATES PATENT OFFICE.

GEORGE F. WHITE, OF MIDDLETOWN, NEW YORK.

CHEESE-PRESS.

SPECIFICATION forming part of Letters Patent No. 228,291, dated June 1, 1880.

Application filed May 5, 1880. (Model.)

*To all whom it may concern:*

Be it known that I, GEORGE F. WHITE, of Middletown, in the county of Orange and State of New York, have invented certain new and useful Improvements in Cheese-Presses; and I do hereby declare that the following is a full, clear, and exact description of the invention, which will enable others skilled in the art to which it appertains to make and use the same, reference being had to the accompanying drawings, which form a part of this specification.

Figure 1:
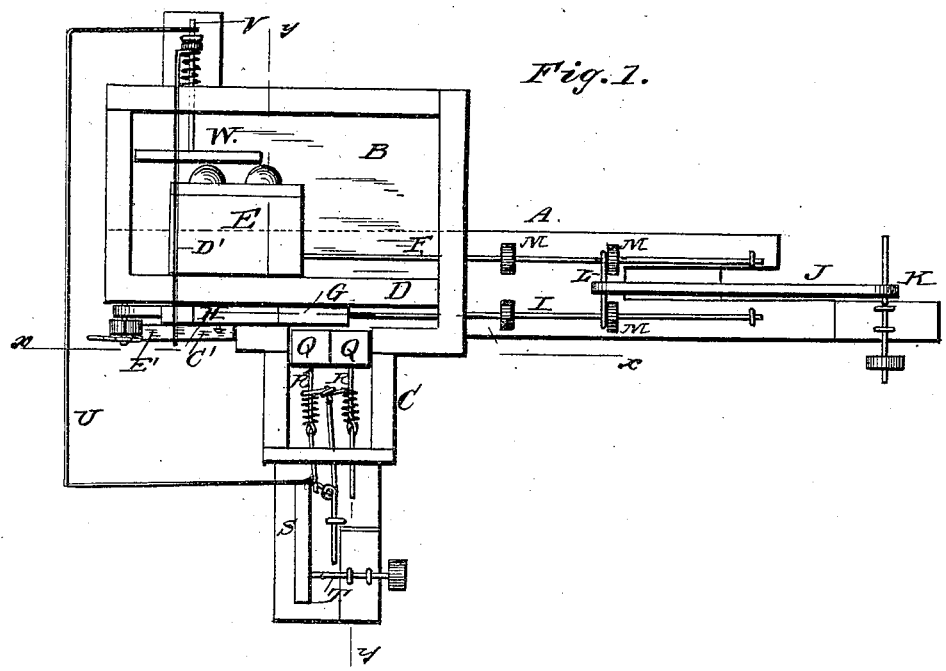
Figure 2:
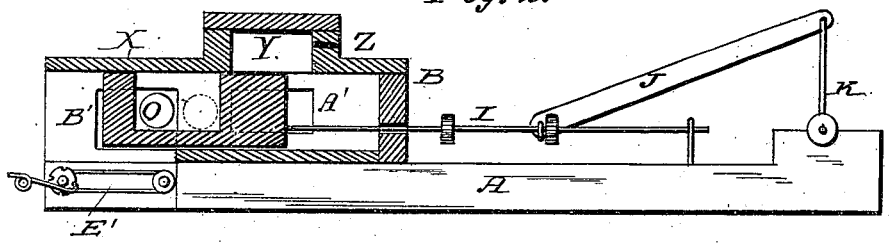
Figure 3:
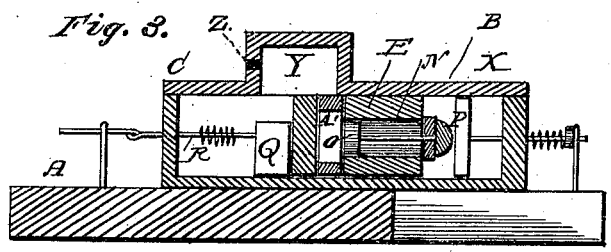

Figure 1 is a plan view of my improved cheese-press, the lid or cover having been removed. Fig. 2 is a section on the line $xx$; and Fig. 3 is a section on the line $yy$, Fig. 1.

Corresponding parts in the several figures are denoted by like letters of reference.

This invention relates to an improved press for molding soft cheese, such as cream-cheese, into small cheeses; and it consists in certain improvements in the construction of the same, which will be hereinafter fully described, and particularly pointed out in the claims.

In the drawings, A represents the base of the machine, upon which are arranged two boxes or chambers, B C, closely adjoining each other and separated by a wall, D. E is the cheese-mold, which is arranged to slide longitudinally in box or chamber B, it being attached to the end of a rod, F, for which a bearing is provided in the end of the box. G is a slide, arranged to move longitudinally between chambers B C, and provided with a recess, H. Slide G is provided with an operating-rod, I, parallel to rod F. Rods F and I are operated by a pitman, J, having one end attached to a crank, K, to which suitable power is applied, and provided at its other end with a cross-head, L, adjusted upon rods F I, between disks M, which are adjustable upon said rods, so as to regulate the length of stroke.

The cheese-mold E consists of a block having transverse openings N, provided with sliding bottoms or followers O. The latter are provided with heads P, projecting outside the mold.

Q Q are press-blocks arranged in chamber C, in which they have a transversely-sliding movement. They are provided with operating-rods R, to which motion is imparted by means of a pitman, S, and crank T. A rod, U, connects the latter with a rod, V, having its bearing in the side of chamber B, and carrying a slide, W, to which a transverse reciprocating motion is thus imparted.

X is the lid or cover of the press, in which is formed a chamber, Y, from which the air may be exhausted through a suitable opening or pipe. The air may also be exhausted from chamber B through an opening or pipe, Z.

I have found that when the air is thus exhausted the cheese may be molded with great facility, even when quite soft.

The side or wall D of chamber B is provided with two openings, A' B', the former of which is directly in front of the press-blocks in chamber C. The latter opening, B', is provided with a cover, C', connected by a rod, D', with the rod V of slide W, with the motion of which the motion of said cover will therefore correspond.

E' is an endless apron arranged under the opening B' to receive the newly-pressed cheeses and carry them off to any desired place. Motion may be imparted to said apron in any suitable manner.

In operation, the soft cheese which is to be pressed is placed in the recess H of slide G, which, as will be seen, has an intermittent reciprocating motion, corresponding with the motion of the cheese-mold. When the slide comes in front of the press-blocks the latter force the cheese through the opening A' into the mold. When the latter comes in front of the opening B' the slide W strikes the heads of the followers O, thus forcing the cheeses out upon the apron E', the door C' having at the same time been opened to permit this to take place.

Having thus described my invention, I claim and desire to secure by Letters Patent of the United States—

1. The combination of the chambers B C, intermittingly-reciprocating cheese-mold E, slide G, having recess H, reciprocating press-blocks Q Q, slide W, and the reciprocating cover X, substantially as and for the purpose set forth.

2. The cheese-mold E, consisting of a block having transverse perforations, provided with sliding bottoms or followers, as set forth.

3. In a cheese-press constructed substantially as described, the combination, with the press-chambers, of means for exhausting the air from the same during operation, as set forth.

In testimony that I claim the foregoing as my own I have hereto affixed my signature in presence of two witnesses.

GEORGE F. WHITE.

Witnesses:
HENRY W. WIGGINS,
W. R. GRAHAM.